United States Patent [19]

Wallis et al.

[11] Patent Number: 4,710,813
[45] Date of Patent: Dec. 1, 1987

[54] LOW BANDWIDTH VIDEO TELECONFERENCING SYSTEM AND METHOD

[75] Inventors: Robert H. Wallis, Portola Valley; William K. Pratt, Saratoga, both of Calif.

[73] Assignee: Compression Labs, Inc., San Jose, Calif.

[21] Appl. No.: 892,738

[22] Filed: Jul. 31, 1986

Related U.S. Application Data

[63] Continuation of Ser. No. 270,619, Jun. 4, 1981, abandoned.

[51] Int. Cl.⁴ .............................................. H04N 7/12
[52] U.S. Cl. ...................................... 358/136; 353/85; 353/105
[58] Field of Search ............... 358/136, 135, 138, 169, 358/85, 108; 179/2 TV

[56] References Cited

U.S. PATENT DOCUMENTS

| | | | |
|---|---|---|---|
| 3,553,362 | 1/1971 | Mounts | 358/136 |
| 3,761,613 | 9/1973 | Limb | 358/136 |
| 4,005,411 | 1/1977 | Morrin, II | 358/135 |
| 4,027,331 | 5/1977 | Nicol | 358/136 |
| 4,047,221 | 9/1977 | Yasuda et al. | 358/85 |
| 4,133,006 | 1/1979 | Iinuma | 358/136 |
| 4,144,543 | 3/1979 | Koga | 358/136 |
| 4,187,519 | 2/1980 | Vitols et al. | 358/169 |
| 4,217,609 | 8/1980 | Hatori et al. | 358/136 |
| 4,258,392 | 3/1981 | Yamazaki et al. | 358/261 |
| 4,307,420 | 12/1981 | Ninomiya et al. | 358/136 |
| 4,364,087 | 12/1982 | Storey et al. | 358/105 |
| 4,389,677 | 6/1983 | Rushby et al. | 358/280 |
| 4,405,940 | 9/1983 | Woolfson et al. | 358/105 |

Primary Examiner—Edward L. Coles, Sr.
Attorney, Agent, or Firm—Fliesler, Dubb, Meyer & Lovejoy

[57] ABSTRACT

A low bandwidth video teleconferencing system and method is disclosed. The video teleconferencing system employs novel data compression techniques by which continuous transmission of imagery at a rate of 9600 bits/second is possible. A sketch coder converts the grey scale image to be transmitted to a sketch or line drawing, which comprises an outline of the principal boundaries plus shading to represent depth. The bandwidth required for the data representing the sketch is then compressed by two-dimensional run length coding techniques which exploit interframe and interline redundancy as well as intraline redundancy to generate a binary transmission code. Other features are also provided.

1 Claim, 12 Drawing Figures

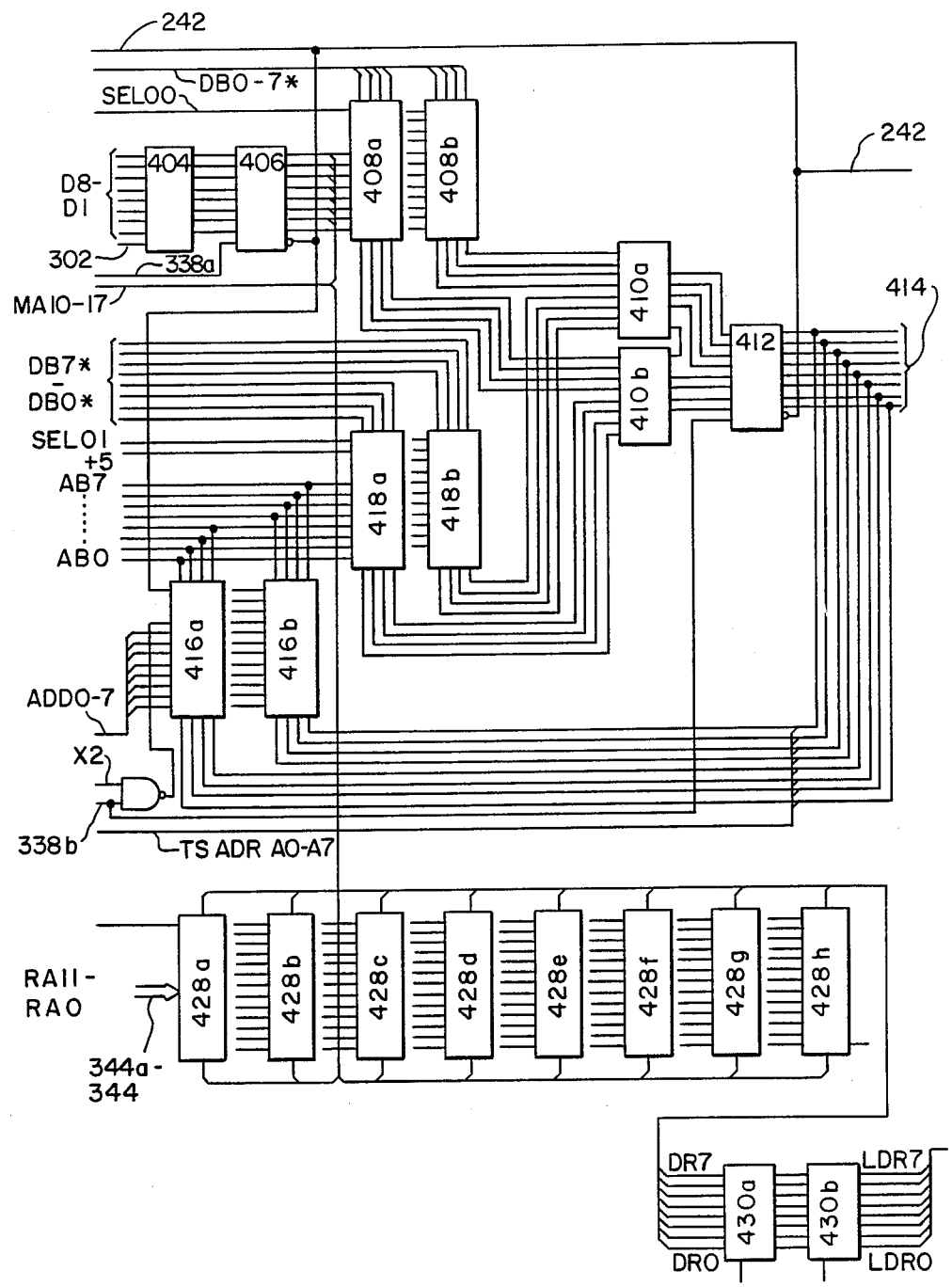
FIG.—3g

LOW BANDWIDTH VIDEO TELECONFERENCING SYSTEM AND METHOD

This a contunuation of application Ser. No. 270,619, filed June 4, 1981, now abandoned.

FIELD OF THE INVENTION

The present invention relates generally to video teleconferencing systems, and particularly to video teleconferencing systems employing bandwidth compressed video.

BACKGROUND OF THE INVENTION

Video teleconferencing systems which utilize the conventional television grey scale are known. For example, Bell Telephone has established video teleconferencing facilities between Los Angeles and San Francisco and also along the East Coast. Similarly, Satellite Business Systems has announced plans for a worldwide, satellite-linked system, and Xerox has announced the XTEN project, a satellite-linked system digital communication network across the United States. In each case, these systems call for image transmission with normal grey scale reduction, and in some instances full color. However, such systems require large bandwidth, and are thus expensive. This and other difficulties have served as deterrents to substantial use of video teleconferencing systems.

The standard method of digital image transmission, as is typically used in known videoteleconferencing systems, is by pulse code modulation where, for monochrome systems, each image frame is sampled over a grid of H horizontal and V vertical picture elements, or pixels. Each pixel is linearly quantized into a predetermined number of levels (B), to produce a uniform codeword of b (equal to $\log_2 B$) bits, which serves as a grey scale resolution factor. The spatial resolution of the image is provided by HV, while the temporal resolution of the image is provided by the number of frames (F) transmitted per second. These factors combine to require a data source rate (R) of $$R = HVFb.$$

For an exemplary system, values of H, V, F and b might be, respectively, 100 pixels per frame row, 150 pixels per frame column, 15 frames/sec and 6 bits per pixel, which leads to a source rate R of $1.35 \times 10^6$ bits/second. Such data rates impose unacceptable bandwidth requirements, making the use of image coding techniques necessary.

Various coding or data compression techniques are known in the art for reducing the required data rate. Differential pulse code modulation provides 2:1 compression compared to PCM and was selected by Bell Telephone Laboratories for its short haul video telephone transmission system; frame replenishment coding provides 6:1 compression and was proposed by Bell for long-haul transmission. Intraframe transform using either Hadamard or cosine transform coding systems also provides 6:1 data compression. Interframe transform using similar techniques can provide 24:1 data compression. Both intraframe and interframe transform techniques have been implemented for remotely piloted vehicle television transmission.

However, none of these state of the art techniques of data compression provides data rates—i.e., bandwidth—which are low enough to be acceptable for use in a video teleconferencing system in which data is transmitted over conditioned telephone lines, where the maximum data rate is 9600 baud. For example, the 24:1 data compression factor (compared to PCM) available with interframe transform still requires a data rate of 56,250 bits/second. Moreover, the obvious choice of reducing the factors of either temporal or spatial resolution does not yield acceptable results, for two reasons. First, such reduction is likely to result in unacceptable image quality; second, the data compression factors given previously will be reduced as spatial and temporal resolution is reduced because of the diminishing correlation of the remaining pixels. As a result there has been a need for data compression techniques and a video teleconferencing system which permit operation at 9600 baud.

SUMMARY OF THE INVENTION

The present invention provides a method and system whereby the foregoing limitations of the prior art are substantially reduced. The video signal from a television camera is provided to a sketch converter, which produces a line drawing representation, or "sketch," of the television image. That representation, which conveys the essential features of the original scene to the human observer, is then converted to a binary transmission code by means of a two dimensional facsimile coding device which utilizes two dimensional run length coding. At the receiver, a sketch decoder receives the transmitted bit stream of binary transmission codes and reconstructs the line drawing sketch for display on a television monitor.

One important advantage of the present invention is the use of a locally adaptive contrast stretching procedure to permit the system to dynamically impose changing multiplicative and additive biases over the image, followed by thresholding to binarize the image. In this manner, detail in the active regions of the image, such as facial features, can be enhanced, while detail in less active areas of the image such as the background, can be suppressed. In effect, the technique operates as a highly nonlinear automatic gain control which measures the local statistics of a pixel in an image and, based on the local activity near the pixel, either amplifies or suppresses the detail.

In addition, the present invention dynamically optimizes the use of the full available bandwidth in that it monitors the image data being transmitted and adapts it to the current bandwidth requirements by effecting a trade-off between spatial and temporal resolution. Scenes in which there is little or no motion are transmitted at a reduced frame rate but with higher spatial resolution and finer detail, while scenes including substantial motion are transmitted at higher frame rates with lower spatial resolution.

Once the original image has been converted to a black or white representation by the binarizer, two dimensional run length coding is employed to convert the representation to a binary transmission code. The coding detects white-to-black and black-to-white edge transitions, which are then encoded for transmission. In addition to using conventional run length coding wherein the position of a transition is identified in terms of its distance from the next preceding transition in the same scan line, the present invention is also capable of identifying transitions in terms of the previous line or the corresponding line of the previous frame. In the event a given transition can be described by reference to either the same scan line or a previous scan line, priorities are established to permit ease of coding. The encoded sequences are then combined in a conventional manner for transmission over a channel. In the event conditioned telephone lines are the selected channel, the combined sequences are first supplied to a modem.

At a receiving station, the transmitted data is then decompressed by separating the sequence codes from the data. Upon detection of a sequence code, a line buffer is shifted to reflect the position of the code, and an error signal is produced which is then operated upon to produce a transition output. Data not including sequence codes are shifted into storage until either a code is received or a flag is detected, at which point non-transition pixels are operated upon to be output in a serial reconstruction format.

It is one object of the present invention to provide a video teleconferencing system capable of operating at low bandwidth.

It is another object of the present invention to provide a method of adaptively thresholding pixel data to dynamically reflect changes in image content.

It is still another object of the present invention to provide improved image data compression techniques.

It is yet another object of the present invention to provide an improved digital image coding system in which run length coding is used in the temporal direction.

It is still another object of the present invention to provide an improved digital image transmission system in which run length coding techniques are used for continuous television coding.

It is another object of the present invention to provide a video teleconferencing system capable of operating at 9600 baud.

These and other objects of the present invention will be better appreciated from the following detailed description of the invention taken together with the appended Figures, in which FIG. 1 is a system level diagram of the present invention.

FIGS. 3a-3j are a detailed schematic block diagram of the binarizer of FIG. 2.

Detailed Description of the Invention

Figure 1:
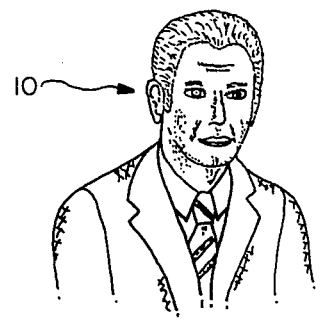
Figure 1:
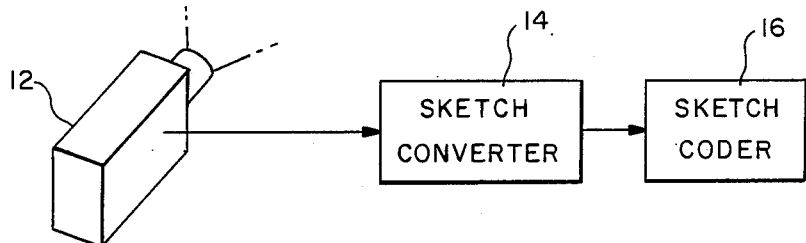
Figure 1:
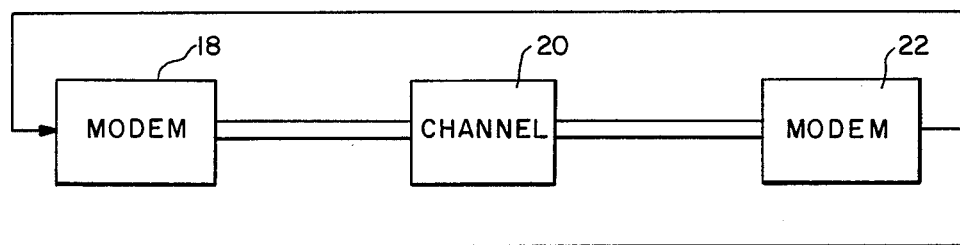
Figure 1:
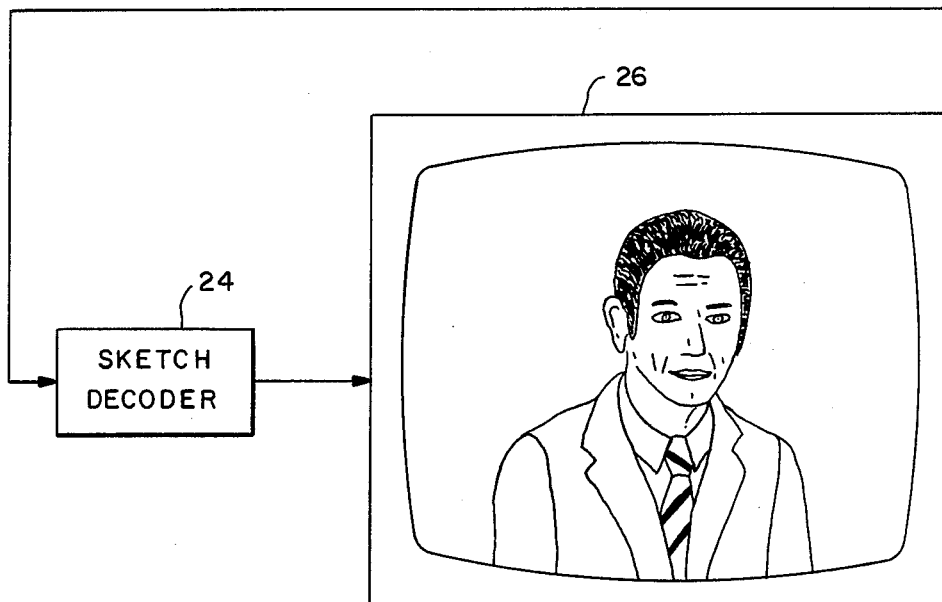

Referring first to FIG. 1, a subject 10 is positioned before a background which is preferably devoid of detail. A conventional monochrome camera 12 is focused on the subject 10, and produces signals representing a conventional gray-scale image. The gray-scale signals are supplied to a sketch converter 14 which, through adaptive thresholding and other digital processing techniques described in greater detail hereinafter, converts the gray scale image to a saturated video image.

The saturated video output of the sketch converter 14 is then supplied to a sketch coder 16, which performs two dimensional (vertical and horizontal) run length coding on the saturated video signals. The coded image is then supplied to a modem 18, of conventional design, or other data transmission means. For the application disclosed explicitly herein, the modem 18 transmits the signals over conventional, conditioned four wire telephone lines. However, any other channel 20 is equally acceptable, such as RF transmissions. For these alternative channels, the modem 18 would be replaced by a suitable transmitter. At the receiving end, another modem or other suitable device 22 receives the signals transmitted over the channel 20 and provides the same to a sketch decoder 24. The sketch decoder 24 converts the coded signals from the sketch coder 16 into a saturated video image for display on a conventional video display 26.

Figure 2:
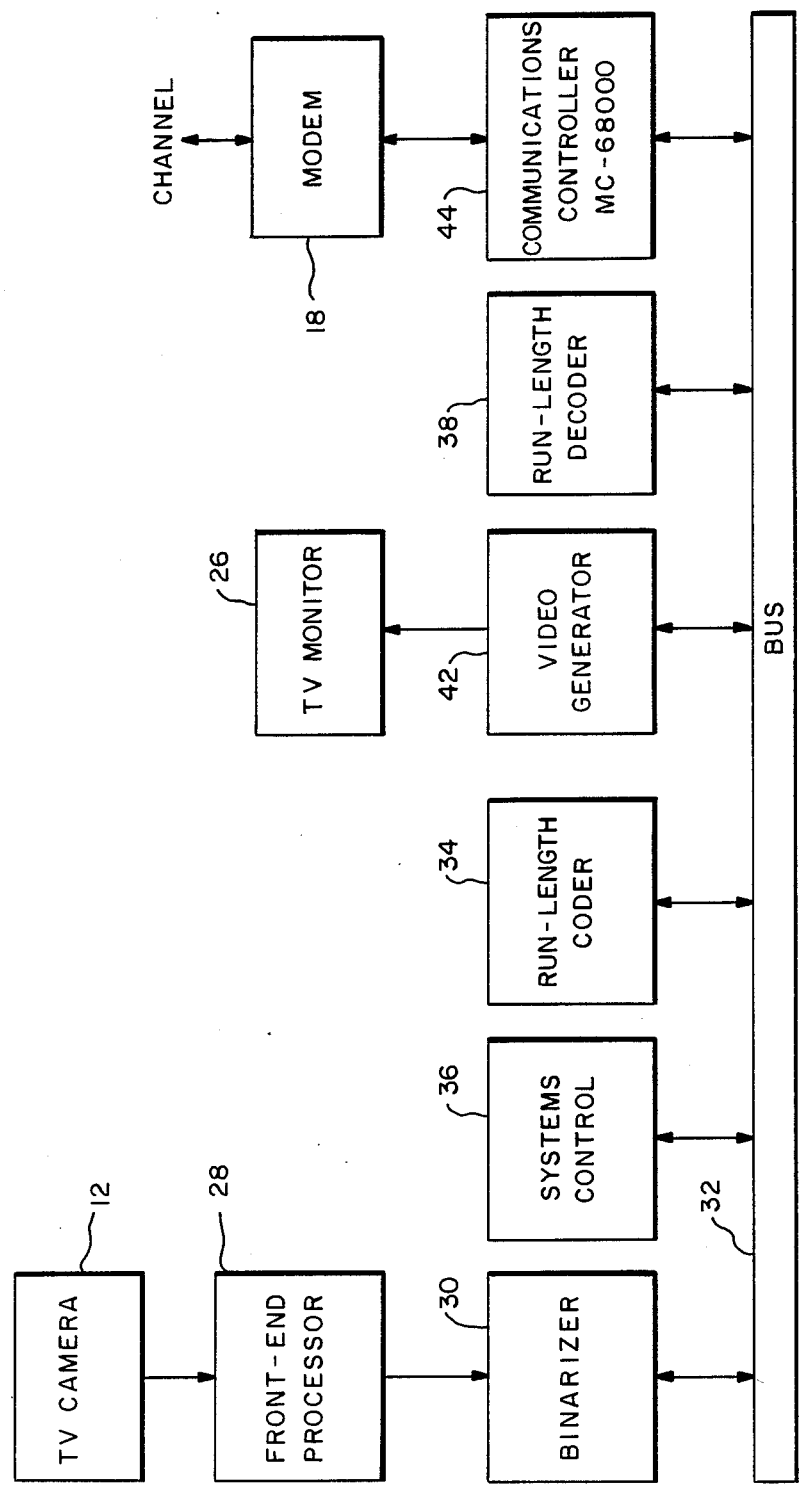
FIG. 2 is a schematic block diagram of one station in the system of FIG. 1.

Referring next to FIG. 2, there is shown therein a system block diagram having greater detail than FIG. 1 wherein the connections of the various building blocks of the processing system are connected to a communications bus. More particularly, the TV camera 12 supplies its gray scale image signals to a front end processor 28, which interfaces with a binarizer 30. The front end processor 28 is of conventional design and converts the analog video signal into digital form, and other well known functions. The front end processor 28 and binarizer 30 together form the sketch converter 14 of FIG. 1.

The binarizer 30 performs the actual task of converting the gray scale image from the video camera 12 to a saturated video image, and communicates via the bus 32 with the remaining portions of the system. The binarizer supplies the saturated video signals it produces to a run length coder 34, which substantially forms the sketch coder 16 of FIG. 1. In addition, systems control logic 36, which may for example be an MC-68000, together with ancillary firmware, provides a hierarchy for bus access. Because the system of the present invention is intended for bidirectional communication, each system also includes the components necessary to receiving and displaying signals transmitted by other stations of the system. Thus FIG. 2 includes a run length decoder 38 in bidirectional communication with the bus 32. The run length decoder particularly communicates with a conventional video generator 42, which in turn supplies video signals to a conventional TV monitor 26 as shown in FIG. 1. A communications controller 44 controls the transmission and receipt of signals over the channel of FIG. 1.

Referring again to the sketch converter 14 of FIG. 1 and more particularly the binarizer 30 of FIG. 2, the logic provided therein performs what may be referred to as a "binarizing algorithm." The purpose of the binarizing algorithm is to transform the incoming gray level image to a binary, saturated video image suitable for run length coding, and involves two steps.

First, a locally adaptive contrast stretching procedure is used to enhance detail in active regions of the image, such as facial features, while at the same time suppressing detail in the less active areas of the image such as the background. To accomplish this, dynamically changing multiplicative and additive biases are imposed over the image, to insure that the majority of the data bits are utilized in coding important features. Secondly, the resultant, contrast stretched image is clipped by a fixed threshold to produce a binary image.

In this manner, every pixel is either black or white, and a saturated video image is produced. In this manner it is insured that the image occupies the entire dynamic range available, thereby improving the contrast in facial features while eliminating the background. General forms of such post processing algorithms for converting an image to a sketch are known, see K. Fujimuro, "Representation of Real World Images With Lines and Solid Regions," Proceedings Fourth International Joint Conference on Pattern Recognition, Kyoto Japan, November 1978.

Traditionally, contrast stretching may be expressed as

PIXEL'(X,Y)=GAIN*PIXEL(X,Y)+BIAS;*

If [PIXEL'(X,Y)>MAX] then
PIXEL'(X,Y)=MAX; and

If [PIXEL'(X,Y)<MIN], then PIXEL'(X,Y)=MIN,

Where PIXEL(X,Y) is the grey level value at (X,Y) for an N bit image and MIN=0, MAX=$2^N-1$, or the maximum value.

* As used herein, one asterisk is used in the equation to represent multiplication; two asterisks represent exponentiation.

In traditional contrast stretching, the multiplicative factor of GAIN and the additive factor of BIAS are not functions of the particular location, or (X,Y), so that each PIXEL is transformed in the same manner without regard to its location. However, spatially variant contrast stretching algorithms can also be used for binarization. In such algorithms,

PIXEL'(X,Y)=GAIN(X,Y)*PIXEL(X,Y)+-
BIAS(X,Y),

If [PIXEL'(X,Y)>MAX] then
PIXEL'(X,Y)=MAX; and

IF [PIXEL'(X,Y)<MIN] then
PIXEL'(X,Y)=MIN.

In this instance, GAIN(X,Y) and BIAS(X,Y) are derived from the local statistics of the image, or the gray levels immediately around the PIXEL of interest and thus change slowly as X and Y change.

In the present invention, two local measures are used in the algorithm for converting the grey level image to a sketch. The first measure is the local average, or MEAN, and the second factor is a measure of the local ACTIVITY, which may be analogized to standard deviation but is calculated in a different manner described in greater detail hereinafter. These measures are used to perform scaling operations which enhance areas of high detail while suppressing areas of low detail. The nature of adaptive contrast stretching can be expressed as [dropping the (X,Y) notation for convenience]:
PIXEL'=TABLE(ACTIVITY)*[PIXEL−MEAN]-
+MEAN The function TABLE produces zero GAIN for areas of low ACTIVITY and a high GAIN for areas of high ACTIVITY, and may be provided by a look-up table. Areas of intermediate ACTIVITY produce intermediate GAINS. One useful description of the function TABLE is

TABLE(ENTRY)=MAXGAIN*[ENTRY/(EN-
TRY+BREAKPOINT)]**EXPONENT, where
MAX GAIN is the maximum gain which the TABLE can obtain,
BREAKPOINT is the value of X for which the table changes from suppression to enhancement, and
EXPONENT is a term governing the suddenness of the change.

One difficulty in the implementation of adaptive contrast stretching is the calculation of local statistics, because the area over which the MEAN and ACTIVITY must be calculated is fairly large.

In a typical system, the area over which such terms are calculated must be on the order of 15 pixels to avoid unnecessary noise or high frequency detail which make coding difficult. Because of the inordinant amount of computation necessary for a straightforward summation, the present invention employs a recursive technique involving a one pole filter. In one dimension, the filter can be mathematically defined as

MEAN(X)=MEAN(X−1)*WEIGHT+PIX-
EL(X)*[1−WEIGHT], which can be reduced by simple algebra to

MEAN(X)=WEIGHT*[MEAN(X−1)−PIX-
EL(X)]+PIXEL(X).

Acceptable values of WEIGHT are, empirically, typically in the range of 0.925 to 0.975, and can be implemented in a look-up table a linear increase in values. The slope of the ramp may be adjusted by the user in accordance with subjective criteria as to image quality. The WEIGHT function can also be determined by other techniques, as by shifting.

Because the one pole filter discussed above has asymmetric properties, it is useful to compensate for the one sided nature used to calculate MEAN (X). This response may be made more symmetrical by determining the difference between the MEAN and the delayed version of the PIXEL, i.e.,

PIXEL'(X)=PIXEL(X−DELAY)−MEAN(X).

The approximate value of the DELAY required to improve this symmetry may be calculated from the formula.

T=LOG (½)/LOG(WEIGHT).

The one dimensional filter represented by the MEAN function may be expanded to two dimensions by performing horizontal filtering after vertical filtering. This necessitates storing a vector of one dimensional MEAN values and activity values derived from the vertical filtering, and then expanding those values in accordance with horizontal filtering of the vectors representing the vertical values. For such expansion, let
M1D(X)=1-dimensional vertical MEANS vector
A1D(X)=1-dimensional vertical ACTIVITYs vector
M2D=instantaneous 2-dimensional MEAN
A2D=instantaneous 2-dimensional ACTIVITY
PIXEL(X,Y)=PIXEL value at (X,Y),
then for values of X from 1 to the number of picture elements per line.
M1D(X)≦WEIGHT * [M1D(X)−PIXEL(X,Y)]-
+PIXEL(X,Y)
M2D≦WEIGHT * [M2D−M1D(X)]+M1D(X)
ACTIVITY≦ABS    [PIXEL(X−DELAY,Y−-
DELAY)−M2D]
A1D(X)≦WEIGHT * [A1D(X)−ACTIVITY]-
+ACTIVITY
A2D≦WEIGHT * [A2D−A1D(X)]+A1D(X)
where
≦denotes "is replaced by"
ABS denotes absolute value
To simplify implementation complexity, the absolute value formulation shown above is used to approximate standard deviations. Because both the 2-dimensional MEAN and the 2-dimensional ACTIVITY levels (M2D and A2D) respectively) are now available, a "stretched" value of the PIXEL may now be calculated which can then be compared to a threshold, specifically

PIXEL'(X,Y)=TABLE(A2D)*[PIXEL(X-DELAY,Y-DELAY) M2D]+M2D

The binary value for PIXEL' may then be compared with a predetermined threshold such that PIXEL'≧THRESHOLD→1 is output PIXEL'<THRESHOLD→0 is output In this manner, the grey level image data initially provided is reduced to a binary format. Included herewith as FIG. 3a FIG. 3i is a hardware implementation of the foregoing algorithm.

Figure 3A:
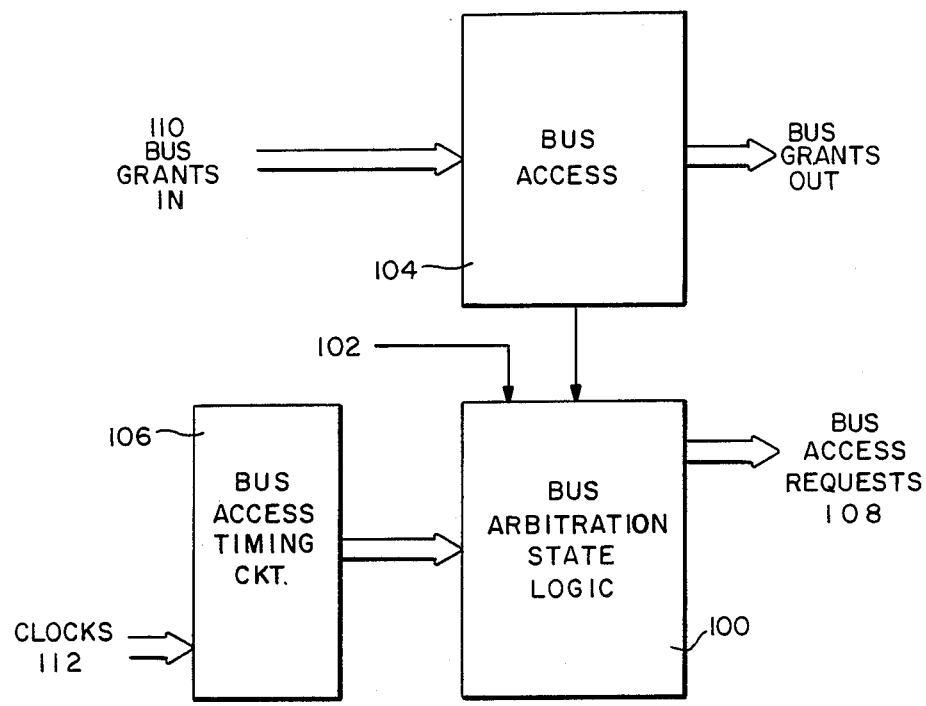
Figure 3B:
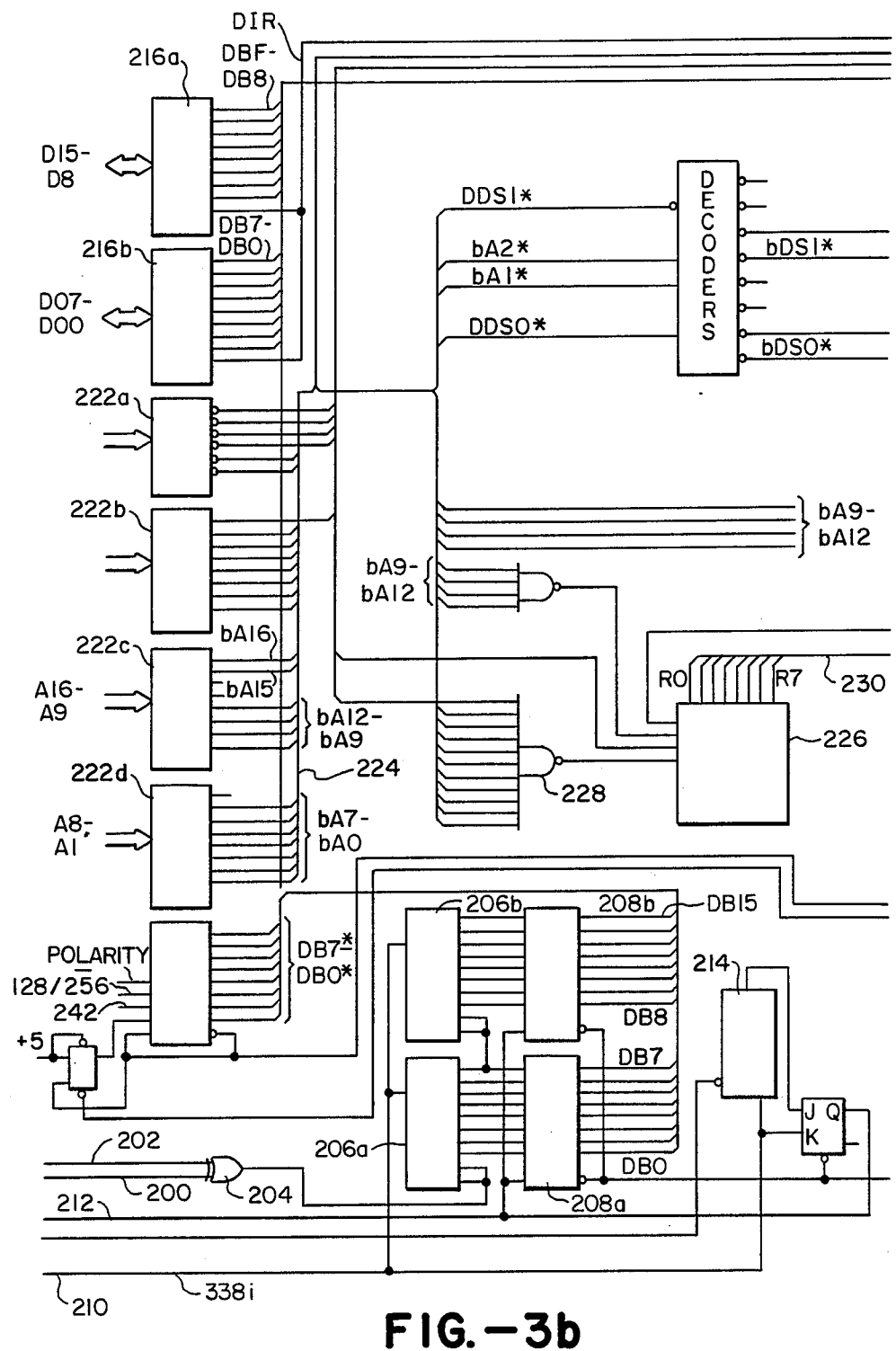
Figure 3C:
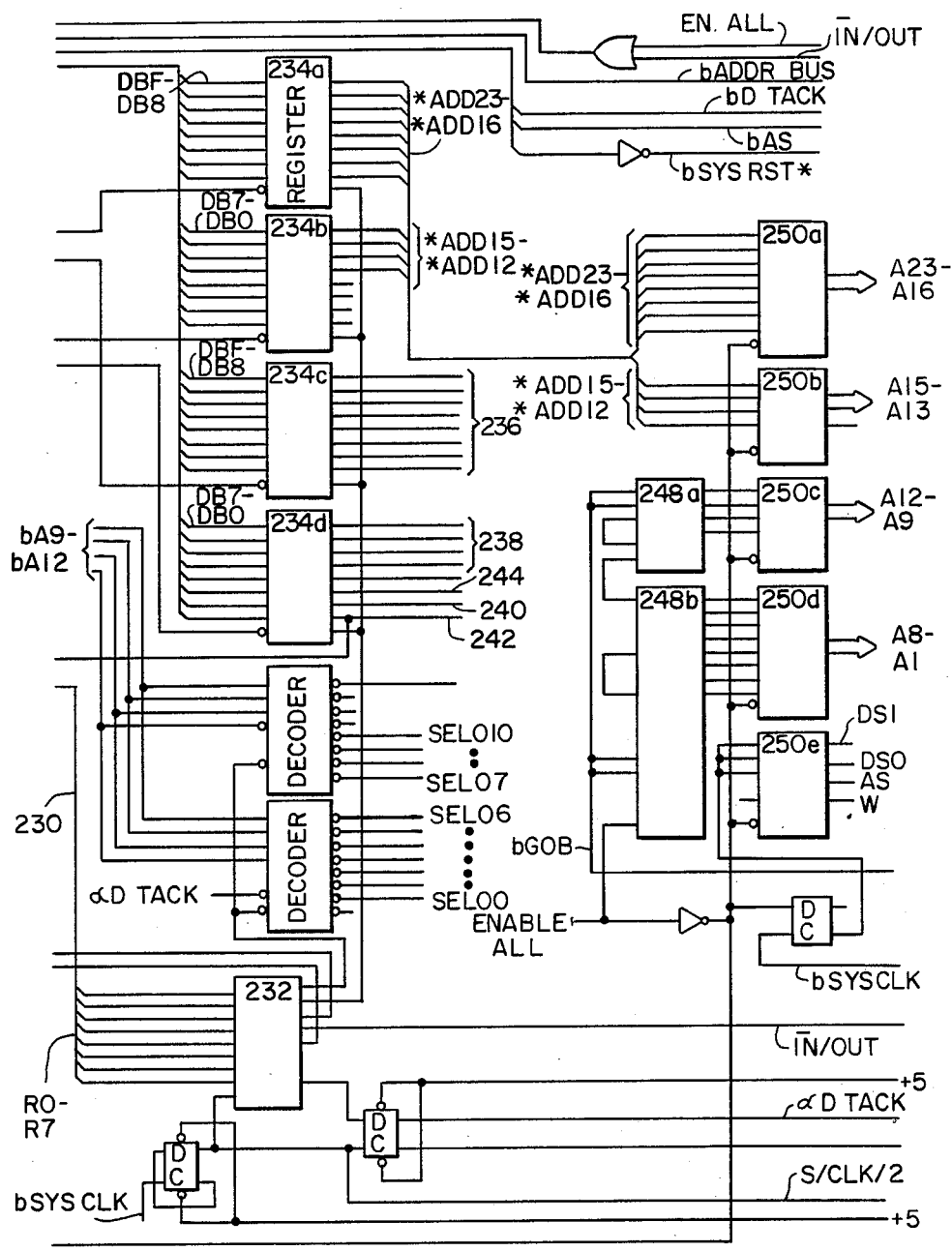
Figure 3D:
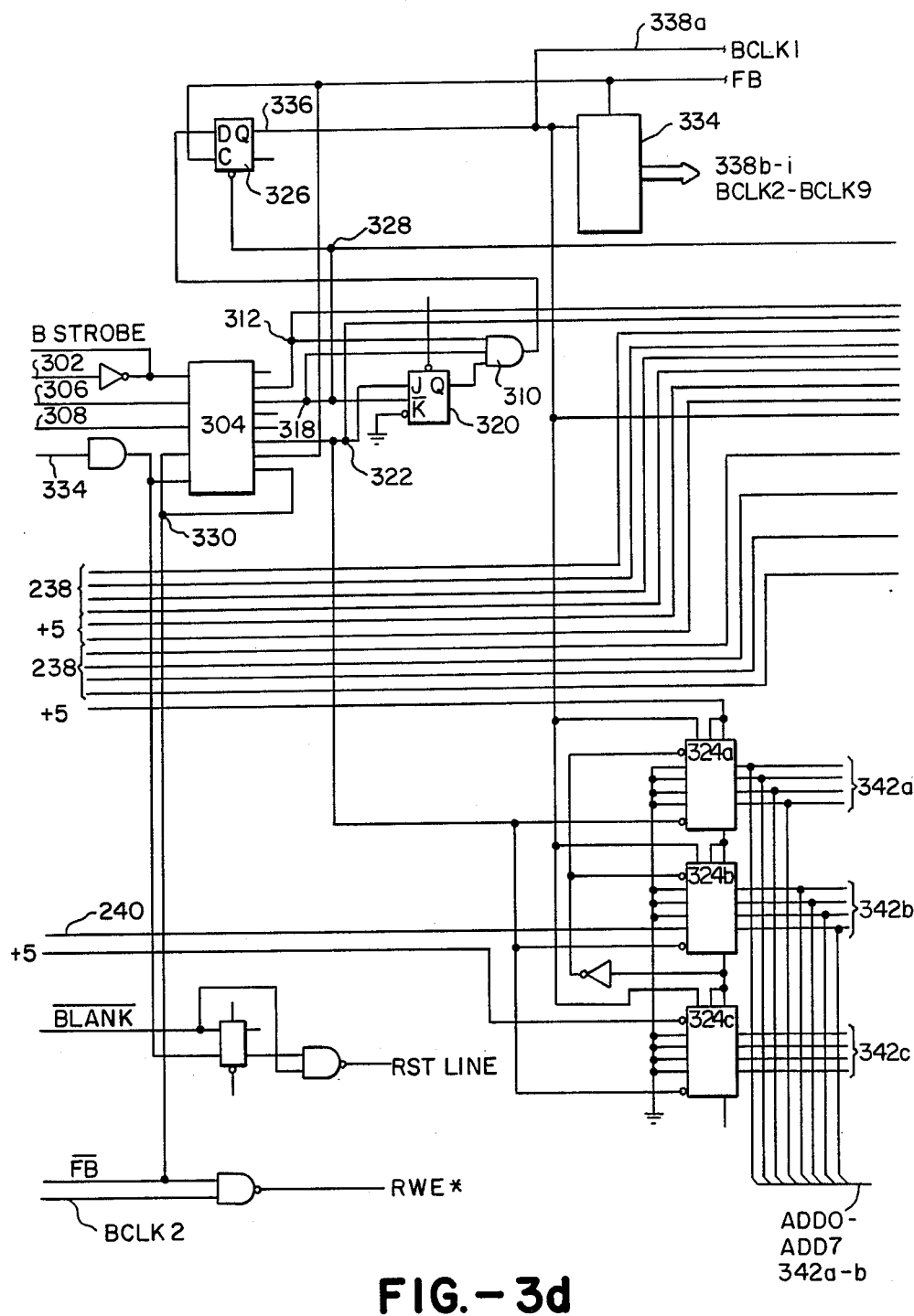
Figure 3E:
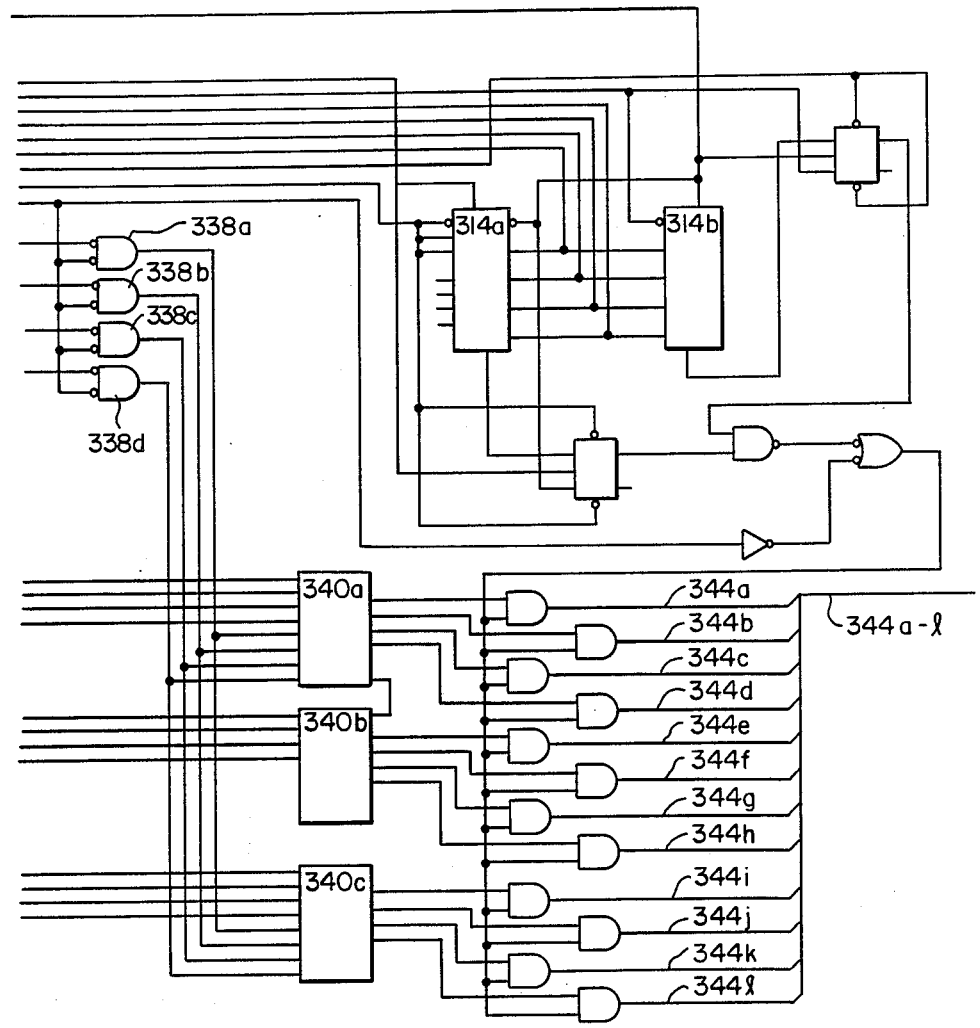
Figure 3F:
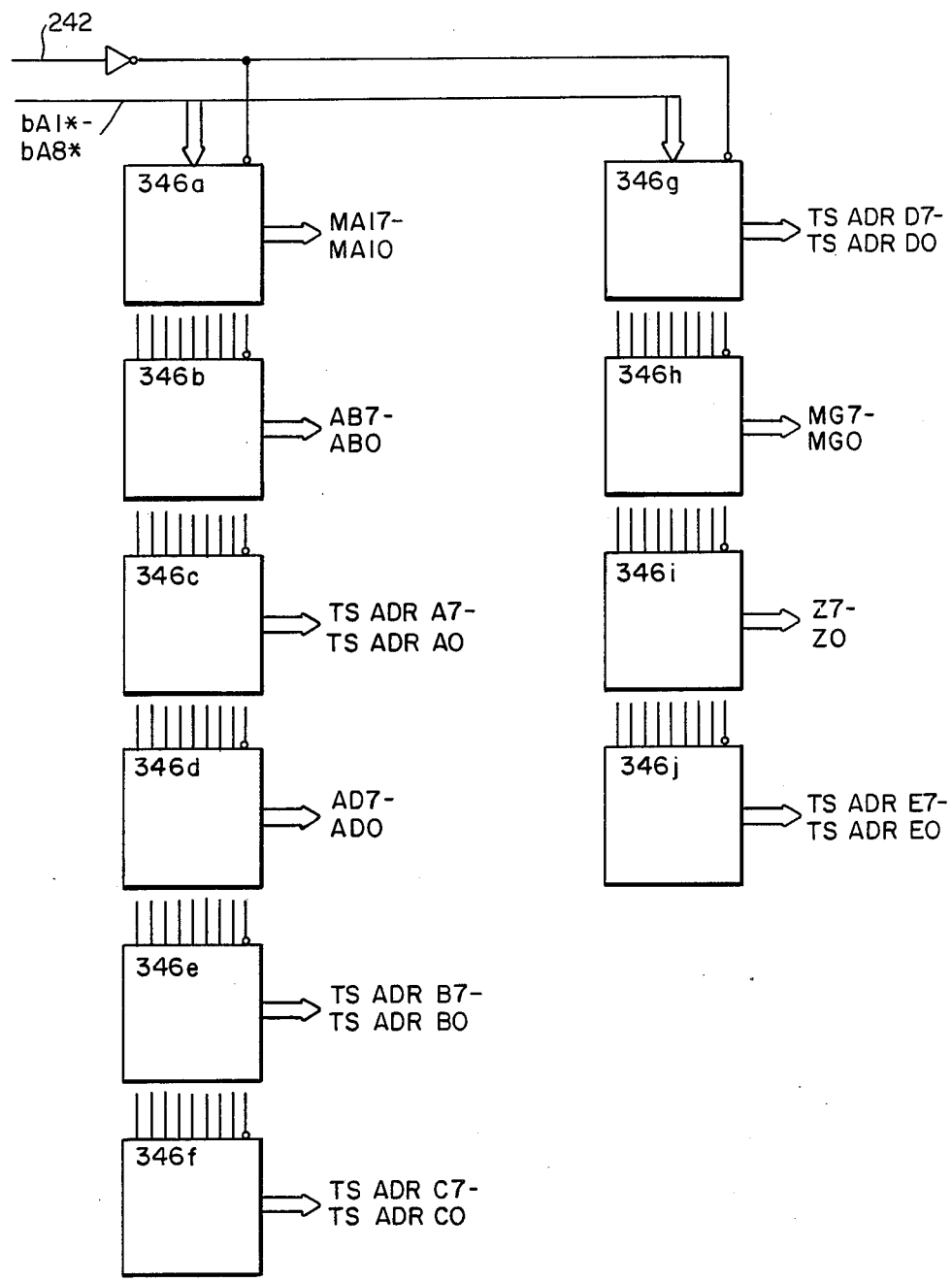
Figure 3H:
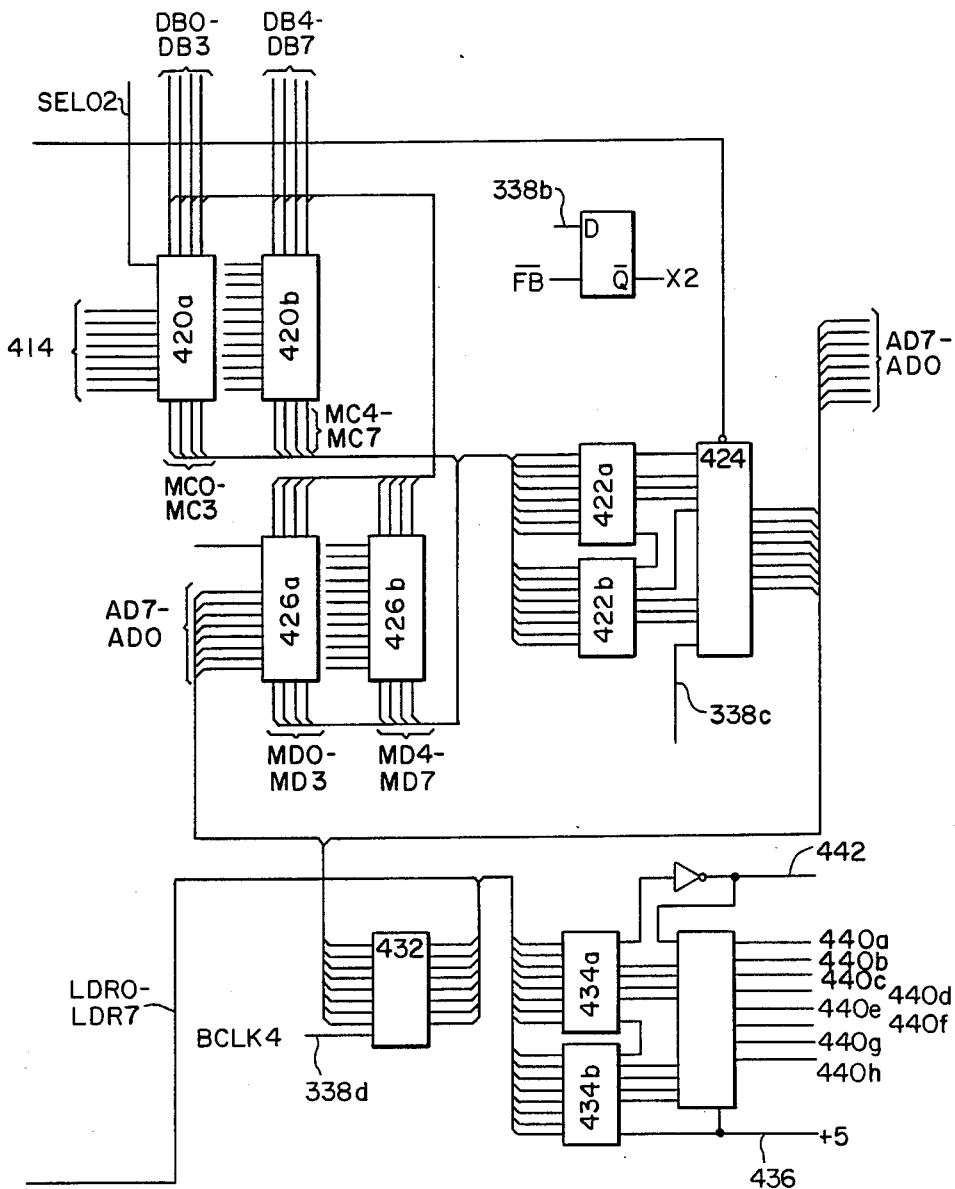
Figure 3I:
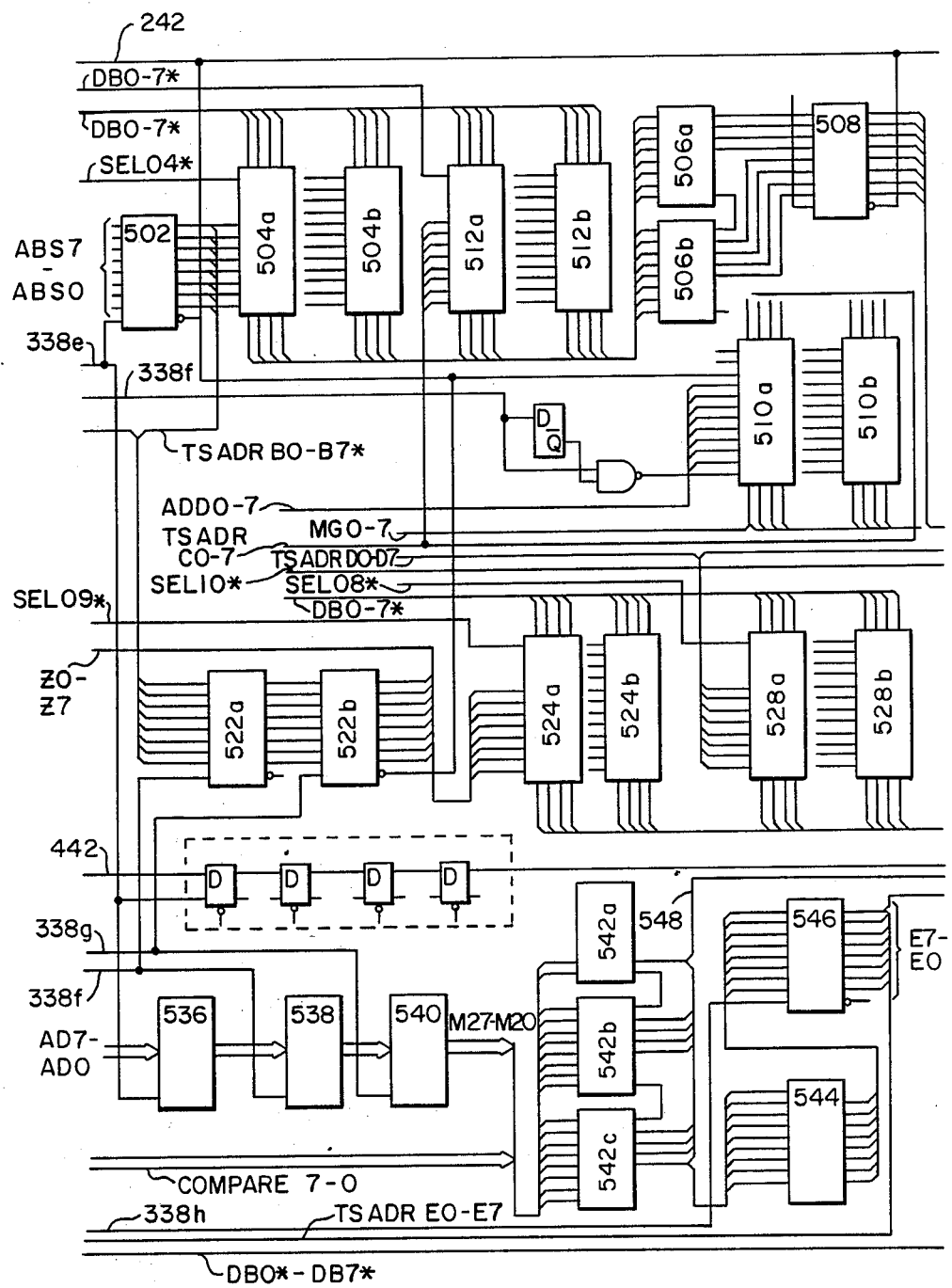

FIGS. 3a-3i reflect a hardware/firmware implementation of the binarizer 30 of FIG. 2, and therefore reflect an implementation of the algorithm discussed above. More particularly, FIG. 3a depicts circuitry for permitting the binarizer to request access to the bus 32 (FIG. 2). Because the exemplary system disclosed herein operates on the Motorola Versabus and related firmware, it will be appreciated that certain of the clocks and access circuitry disclosed herein are intended to operate with such a system. However, those skilled in the art will recognize that the present invention can be implemented with any of a number of CPU's and bus communications systems.

Referring to FIG. 3a again, the bus arbitration state logic 100 receives a Data Available signal on a line 102. The bus arbitration state logic 100 communicates with bus access logic 104 and receives inputs from a bus access timing circuit 106, in a conventional manner. Ths bus arbitration state logic 106 thereupon generates bus access requests on lines 108. The systems controller 36 (FIG. 2) will, at some point of normal operation, generate a bus grant signal on lines 110, which will be by the binarizer 30 in a conventional manner. System clock signals 112 are provided to the bus access timing circuit 106 to assist in ensuring that no collisions occur on the bus 32.

Included within the bus arbitration state logic 104 is a timing circuit to terminate any bus access request in the event bus access is delayed beyond a predetermined period. As will be appreciated by those skilled in the art, such a timing circuit should never operate during normal system operation. As will further be appreciated by those skilled in the art, the bus access requests 108 operate in conjunction with other signals provided by the binarizer to permit communication with the remaining system blocks.

Referring next to FIG. 3b through 3c, the logic circuitry shown therein may generally be regarded as address and data bus interface logic, the primary function of which is direct memory addressing, although other functions such as threshold storage and spatial offset are included therein. Serial data is provided on line 200, the polarity of which is provided on line 202, and the two signals are exclusively ored together in gate 204. This serial data input from the front end processor 28, which arrives at a high data rate on the order of 10 MHz, is then shifted through a pair of registers 206a and b such as the 74LS164. Once the sixteen databits are serially shifted into the registers 206a-206b, they are loaded in parallel into buffers 208a and 208b. The buffers 208a and b may, for example, be 74LS374 devices. In general, the implementation disclosed herein incorporates low power Schottky circuitry in the majority of the devices, with high speed Schottky devices in the critical paths. The buffers 208a and b are provided primarily for flexibility in operating on the incoming serial data, such that sixteen clock times are available to operate on the data. Clock signals are supplied to the registers 206a and b via line 338i, described in detail hereinafter, which forms part of the timing for the pipeline processing of the present invention. Clock signals are supplied to the buffers 208a and b via the data available line 212.

The loading function described in connection with registers 208a and b is accomplished through a sixteen bit counter 214, which may, for example, be a 74LS161. The counter 214 indicates when the registers 206a-b are full, to permit timely processing. When the data stored in the buffers 208a and 208b are ready to be processed onto the bus, they are supplied to buffers 216a and 216b. Buffers 216a-b are tristate when inactive, such that no bus loading occurs when the buffers are not enabled. The buffers 216a-b may, for example, be 74LS640 devices. The buffers 216a-b provide outputs to the data bus on lines 218 and 220. The remaining buffers 222a, 222b, 222c and 222d are provided to minimize bus loading, and serve merely as buffering for address and other signals. Thus, the buffers 222a-d receive address information from the bus and supply that information to remaining portions of the circuitry on lines 224, which for convenience are shown as a single line. For example, various portions of the buffered address are supplied to a PROM 226 through nand gate 228. The PROM 226 serves as a state sequencer and performs conventional state functions in supplying signals to the remainder of the circuitry. For example, register outputs 0 through 7 are supplied by the PROM 226 on lines 230 to an octal latch 232.

The data received on the data bus and stored in the buffers 208a and b is also provided to a series of registers 234a, 234b, 234c and 234d. The registers 234a and 234b are provided for storage of constant or slowly changing portions of the memory addresses, while the register 234c is provided for storing the threshold value discussed previously. Such information is supplied by the systems control 30 (FIG. 2). Register 234d is provided for storage of a spatial offset as discussed in more detail hereinafter but noted in connection with the algorithm discussed hereinbefore. In addition, the register 234d also provides a data bit for selecting the number of pixels per line and column. For example, the system can operate on 128 pixels per line, or 256. Finally, register 234d receives a signal from the CPU for determining whether the binarizer logic will be active or quiescent. The binarizer logic is placed in the quiescent state when the CPU needs to write into the registers, or during initialization, but is placed in the active state to permit data transfers on the bus. In addition, a polarity bit for converting a positive image to a negative image may also be included at line 244.

The output of the registers 234a and 234b are address bits which are then provided to a direct memory address generator 246 of a substantially conventional nature including counters 248a and b and latches 250a through e. In simple terms, the direct memory address generator 246 takes addresses and, writes into a devised address-mapped location. Such a function is generally referred to as address mapping. The outputs of the latches 250a-e are then supplied to the bus 32 for communication with the remainder of the system. Also included in the address mapping logic are decoders 252a–b, which receive as inputs the first four bits from buffer 222d on lines 254a–d.

Referring next to FIGS. 3d through 3e, control inputs are provided at the left from the systems control 36 and front end processor 28. At line 302 the signal B Strobe, which is active low, is provided to a latch 304 for a latch and hold function. On line 306 a blanking signal is provided, which is active (low) during the horizontal retrace internal. Also, at line 308 a Go Binarizer signal is provided, which, as noted previously, enables the binarizer action. The 'Go Binarizer' signal is of a variable frequency and may occur as seldom as once per frame of video data.

The complement output of the latch 304 associated with B Strobe signal 302 is then supplied to a nand gate 310 on line 312, which also supplies clock signals to a counter 314a and a JK flip-flop 316. The blanking signal 306 is supplied at the output of the latch 304 on a line 318 and provides a second input to the nand gate 310 as well as the clock input to a JK flip-flop 320. The complement output of the Go Binarizer signal 308 is provided on a line 322 to the J input of the JK flip-flop 320. The signal on line 322 is also supplied as the active low reset inputs to a plurality of counters 324a, 324b and 324c.

The output of the J,K flip-flop 320 provides the third input to the nand gate 310, the output of which is provided to the input of a D flip-flop 326. The set input to the flip-flop 326, which is active low, is provided by the output of the latch 304 associated with the blanking signal 306, on line 328.

The input to the first latch of the quad latch 304 is provided from the complement output of that same latch on a line 330, which also provides an input to a nand gate 332. The clock input to the quad latch 304 is provided on line 334. The output of the first latch of the quad latch 304 provides a clock input to the D flip-flop 326 as well as the clock input to a serial-in, parallel-out shift register 334, which may for example be a 74S164. The output of the D flip-flop 326 provides a signal on line 336 which provides the data input to the shift register 334. The function of the logic beginning with the latch 304 and continuing through the shift register 304 is to provide the clocks neccesary to operate the pipeline of the present invention, such that bursts of 256 clock pulses are supplied to the shift register 334 which then provides a plurality of 9 pull strains B clock 1 through B clock 9 (BCLK1–BCLK9) on the outputs of the shift register 334 on lines 338. Each clock is delayed relative to the next previous clock so that a total delay of 9 clocks is required from the first pixel in to the first pixel out of the pipeline. The pulse trains are active when the Go Binarizer signal 308 and B strobe signal 302 are active and the blanking signal 306 is inactive, as can be determined from the and gate 310.

The clock signals to the counters 324a–324c, which may for example be 74S161 type devices, are provided on the line 336. The counters 324a–c provide a 4096-bit counter which pauses during the horizontal retrace interval. In this manner the maximum allowable delay for subsequent processing and registration is set. In addition, the line 336 provides one input to each of four nor gates 338a–b. The remaining inputs to the nor gates 338a–b are provided by the offset signals Offset 0 through Offset 3 provided on line 238, respectively. In this manner, the offset is on during read but off during the write functions. The purpose of the offset, as will be appreciated by those skilled in the art, is to bring the sharp image into registration with the defocused image; the defocused image is shifted as the result of the recursive filtering with a one pole filter as discussed in greater detail hereinafter.

The output of the nor gates 338a–d are supplied to the least significant and most significant bits of a 12-bit adder comprised of adders 340a, 340b and 340c. The remaining inputs to the adders 340a–c are provided by the outputs of the 4096-bit counter 324a–c. It will be appreciated that the output of the adders 340a–c will be two sets of addresses between 0 and 4096, where one set is delayed relative to the other. In this manner, those skilled in the art will recognize that a spatial offset is generated for the PIXEL information stored at each address. As will be discussed further hereinafter, in this manner the nonfiltered image will be placed into registration with the image which has been defocused for contrast stretching purposes through recursive digital filtering. Thus, the register addresses which form the output of the adders are provided on lines 344a–l, addresses. Appropriate timing and gating logic, including counters 314a–b, ensure that the address bits on lines 344a–d are available to the proper times.

Referring next to FIG. 3f, there is shown therein a plurality of RAM address buffers 346a–j which receive their inputs in parallel from lines 324 and more particularly the output of latch 222d, in a conventional manner.

Referring next to FIGS. 3g through 3h, there is shown therein the digital filters for vertical and horizontal recursive filtering of the pixel values to obtain a MEAN value of the pixels.

Incoming pixel data is provided on line 402 and generally comprises 8 bits of data. The data is clocked into a first latch 404 by B Strobe signal 302. The information is then clocked into a second input data latch 406 by BCLK1 signal 338a. The output of the latch 406 is provided to a pair of lookup tables 408a and 408b which perform feed-forward scaling for the digital filter. The lookup tables 408a and 408b may for example be 93422 type devices or other similar high speed RAM. The output of the lookup tables 408a–b is provided to the adders 410a–b, which serve as the summing point of the one pole filter. The output of the adders is latched into an octal latch 412, where it is provided on lines 414 to a recirculating 256-bit memory 416a and 416b, both of which may also be 93422 devices. The function of the memory 416a–b is to store a vertical line of information so that vertical filtering can be performed first. Such storage is needed since video information is provided in a horizontal format. The outputs of the memories 416a–b are then supplied to another pair of lookup tables 418a–b. The lookup tables 418a–b provide feedback scaling for the recursive filter and the output thereof is provided to the adders 410a and 410b. In this manner, a one pole, low pass digital filter is provided for determining the one dimensional (vertical) mean of the pixel data.

When the data has been properly filtered, the output thereof is cascaded at the latch 412 into a horizontal recursive filter of similar format at the lines 414, which provide the inputs to another pair of lookup tables 420a and 420b. The lookup tables 420a and 420b provide feed forward scaling for horizontal filtering of the now-vertically defocused PIXEL information.

The outputs of the lookup tables 420a and 420b are then provided to adders 422a and 422b, which serve as the summing point for the horizontal one pole filter. The output of the adders 422a–b is provided to an octal latch 424.

The output of the octal latch 424 is then fed back to another pair of lookup tables 426a and 426b. The lookup tables 426a and 426b provide feed back scaling for the horizontal filtering, and the outputs thereof are then provided as the second inputs to the adders 422a and 422b.

After sufficient recursive filtering, the output of the latch provides a 2-dimensional MEAN or average of the local value of the gray level for a particular PIXEL, with the filtering providing appropriate contrast stretching. It will be appreciated that no recirculating memory, such as the memory 416a–416b, is required for horizontal filtering. The register address signals through 344a–l are provided to a plurality of memories 428a–g, which receive their data in inputs from the outputs of the latch 406. The data outputs of the memories 428 are provided to a pair of latches 430a and b, which function to compensate for pipeline delays. The output of the latch 424 is also provided to a binary inverter 432, which provides at its output the two's complement of the 2-dimensional MEAN [M2D(X)]. The complement is then added to the instantaneous value of the PIXEL element provided at the output of latch 430b in adders 434a and b. The output of the adders 434a and b are provided to an absolute value lookup table 438, which may for example be an 82S141 device. In addition, a 1 is added to the value supplied by the adders 434a and b provided to the adder 434b at line 436 thereof, which is tied to the positive supply. The addition of the 1 will, as recognized by those skilled in the art, permit the subtraction of the MEAN or average value of the PIXELS from the instantaneous value of the pixels. Thus the output of the logic shown is the absolute value of the PIXEL less the MEAN value, provided on lines 440a through h. It will be appreciated that a sign bit is also provided on a line 442.

Figure 3J:
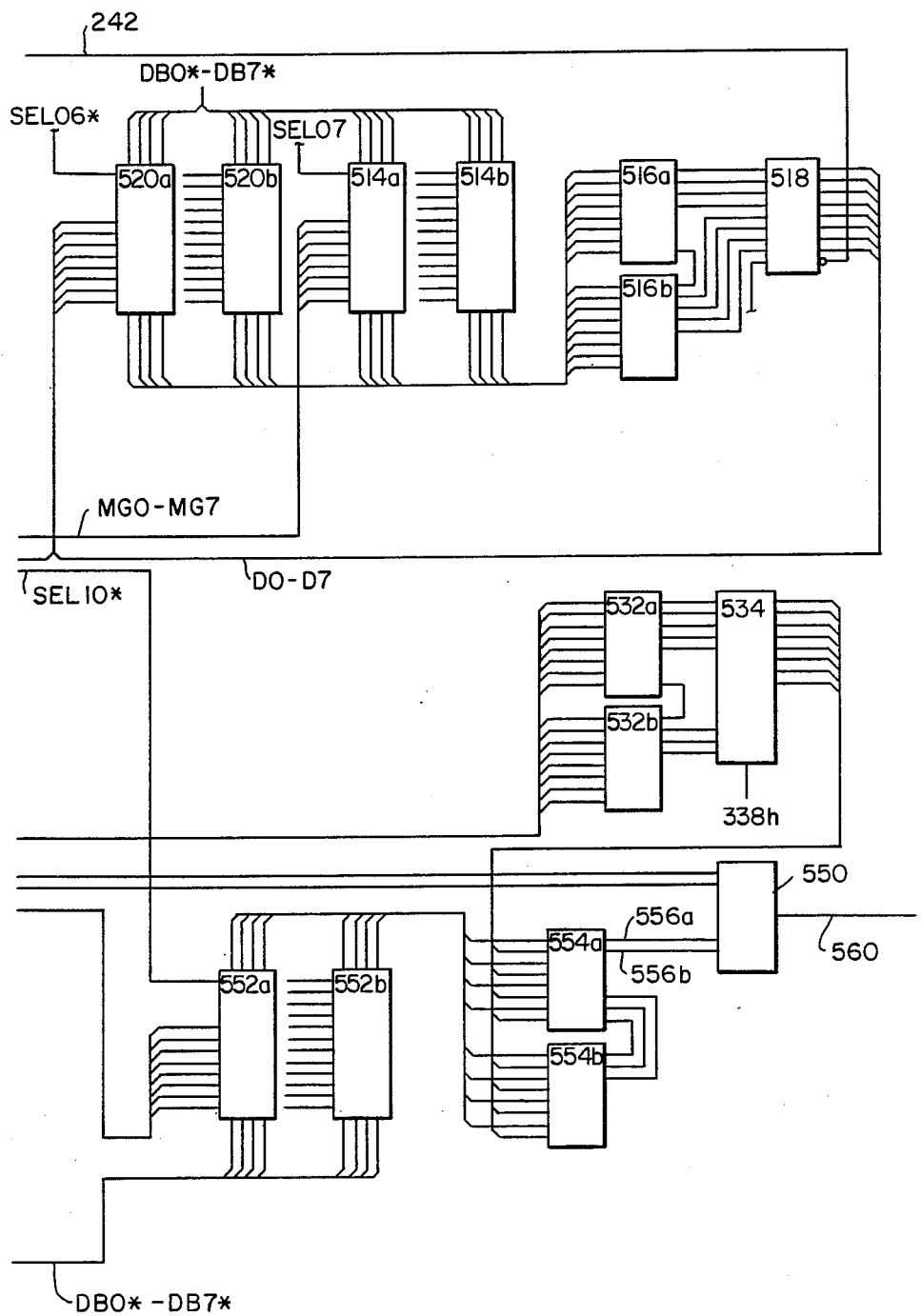

Referring next to FIGS. 3i through 3j, the lines 440a–h are supplied to an octal latch 502, which is clocked by BCLK5 signal 338e. The latch 502 is enabled by the bus binarizer signal on line 242. That data stored in the latch 502 is then provided to the remaining logic circuitry for calculating the activity of the pixel in a recursive filtering technique utilizing one pole filters similar to that used for calculating the mean as discussed above.

The data in the latch 502 is provided to lookup tables 504a and 504b, which provide feed forward scaling and submit an output to adders 506a and 506b. The output of the adders is then latched into an octal latch 508, where it is fed back to recirculating memory 510a and 510b. It will be appreciated that this portion of the circuitry is for vertical filtering, similar to the vertical filtering of the mean discussed above.

The output of the recirculating memory 510a and 510b is then provided to the inputs of another pair of lookup tables 512a and 512b, which perform feedback scaling. The outputs of the lookup tables 512a–b then provide the second input of the adders 506a–b, to complete the feedback loop. As a result, the output of the latch 508 will ultimately provide a vertically filtered activity level.

This is then converted to a two-dimensional filtered activity level by cascading the outputs of the latch 508 into a pair of lookup tables 514a and b, which provide feed-forward scaling for the horizontal filtering. The outputs of the lookup tables are then provided to a pair of adders 516a and b, which function in a manner similar to those described previously. The output of the adders 516a–b is then provided to an octal latch 518, whereupon it is fed back to the inputs to a pair of feedback scaling lookup tables 520a and b.

The outputs of the latch 502 are also provided to a pair of octal latches 522a and 522b. The latch 522a is clocked by BCLK6 signal 338f, while latch 522b is clocked by BCLK7 signal 338g. The latches 522a and 522b provide timing to compensate for processing delay in the pipeline of the present invention.

The output of the latch 522b is then provided to lookup tables 524a and 524b, which provide a log of the absolute value of [PIXEL−M2D]. The output of the lookup tables 524a–b is then provided on lines 526.

Similarly, the two dimensional activity level, A2D(X) is provided to the inputs of another pair of lookup tables 528a and 528b, which provide the log of the activity level A2D. The output of the lookup tables 528a–b is then provides on lines 530.

The log of the activity level is then added to the log of the absolute value of P–M2D and adders 532a and 532b, which then provide a sum to octal latch 534. The output of the latch 424 is also provided to the inputs to octal latch 536, which is clocked by BCLK5 signal 338e. That information is then clocked through two additional octal latches 538 and 540, which are clocked by BCLK6 signal 338f and BCLK7 signal 338g, respectively, to provide compensation for pipeline delays. The output of the latch 540 then provides one set of inputs to adders 542a, 542b and 542c. The remaining inputs to the adders 542a–c are the THRESHOLD bits provided on lines 236 from register 234c (FIGS. 5b–c). As will be appreciated by those skilled in the art, the threshold bits in register 234c may be adjusted by the user to provide a suitable level yielding a satisfactory image. The output of the latch 540, which provides the negative of M2D(x), is thus added to the THRESHOLD level by the adders 542a–c.

The output of the adders 542a–c is then provided to a lookup table 544 which takes the absolute value of the difference between the threshold and M2D(X). The lookup table 544 may for example be an 82S141 device. The output of the table 544 is then provided to a latch 546, while the sign bit for the difference is provided on a line 548 as an input comparator 550. The absolute value of [THRESHOLD−M2D(X)] is provided at the output of the latch 546 and serves as the input to a pair of lookup tables 552a and 552b, which determine the log of the absolute value of [THRESHOLD−M2D(X)]. The output of the lookup tables 552a–b is then provided as one input to a pair of comparators 554a and 554b. The remaining input to the comparators 554a–b is the sum of log [GAIN A2D] and log [ABS(P−M2D)].

As a result, the output of the comparators 554a–b is the final output for the algorithm discussed above, and yields a comparison of whether the sum of the logs of (A2D) and (P−M2D) is greater than or less than the log of (threshold−M2D). This information is then provided to the select circuit 550 on lines 556a and b. The last remaining input to the select circuit 550 is provided by the sign bit for the term P−M2D which provides an input on the line 558. The select circuit 550 then takes into account the signs of the various bits so that the absolute value terms added by the various lookup tables 524, 528, and 552 can be taken into account. The output of the select circuit is provided on line 560 and yields a binary output representative of the pixel in question. It will be appreciated by those skilled in the art that the logic of FIG. 5a–5j implement the sketch converter algorithm described hereinabove. Thus, the output of the select circuit 550 on the line 560 is the final output of the binarizer logic 30 shown in FIG. 2.

Once the grey level image data has been reduced to a binary format, still further compression is necessary to achieve the goal of operation at 9600 baud. Such compression can be accomplished by exploiting the spatial and temperal redundancy of the image data. Such spatial and temporal redundancy has previously been employed in data compression by means of two-dimensional run length coders which encode the positions of black to white or white to black transitions. In some coding systems, positions of transitions can be encoded relative to the previously encoded line to abbreviate the two-dimensional coding process.

According to the present invention, the 2-dimensional coder may provide reference not only to the previously coded line but also to the corresponding line of a previous frame. In addition, because temporal motion is locally retilinear for most video transmissions of head and shoulder images; an application to which the present invention is particularly suited, the current line of the video image may correlate more closely with the line above or below it in the previous frame if a slight movement of the subject has occurred in between. Since the present invention is intended to offer temporal resolution of between two and eight frames per second, and nominally 7.5 fps, although other ranges are possible, the correlation is also performed with the previous frame shifted by one pixel in each lateral, vertical or diagonal direction.

The first step in the algorithm of the run length encoder is to determine whether the greatest correlation exists between lines in the current frame and lines in the previous frame; or between successive lines in the current frame. In cases of sudden motion, the current frame will usually exhibit the greater redundancy; i.e., the intraframe correlation will be greater. However, if little movement has occurred, the previous frame is likely to show the greater correlation or the interframe correlation will be greater. In accordance with the present invention, the frame showing the greater redundancy is used as a reference. In addition, the correlation between the current frame and the previous frame is calculated so as to accommodate a one pixel shift due to motion. Since a given pixel is surrounded by eight adjacent pixels, it can be seen that a total of one intraframe and nine interframe correlations will be calculated by the systems controller 36 (FIG. 2). The correlation can be calculated by letting PREV (X,Y) = The pixel value at (X,Y) in the PREV frame CURR (X,Y) = The pixel value at (X,Y) in the CURR frame

CORRELATION (COLSHIFT, ROWSHIFT) =

-continued

SUM[$X = 1, NCOL; Y = 1, NROW$] [XOR [CURR($X +$ COLSHIFT, $Y+$ ROWSHIFT), PREV($X, Y$)] ]

where XOR[A,B] denotes the "exclusive-or" between A and B. The resulting correlations are then compared, and the frame showing the greatest correlation is selected as the reference. The appropriate reference frame, and included reference lines, having been determined, line difference code words or run length code words are generated to specify the location of the transition relative to the reference. Once the reference line is selected, the current line is then coded in a conventional manner in accordance with EIA Stds. proposal No. 1301-A, which will, if adopted, become Std RS 465. The encoded data is then transmitted via the communication controller by any of the standard bit oriented data link protocols (e.g. HDLC, SDLC). The output of the communications controller 44 includes information from which the receiver can determine whether the coding is intraframe or interframe. As shown in FIG. 2, the communications controller 44 communicates with other stations over the channel via a modem or other suitable device as required by the particular channel.

Upon receipt of the coded video information at a receiving station, the information is decompressed in a substantially conventional manner.

Following reconstruction, the video image is supplied to the video generator 42 of FIG. 2 and displayed on a TV monitor such as 26 of FIG. 2.

It will be appreciated by those skilled in the art, given the teachings herein, that various alternatives and equivalents may be made which do not depart from the spirit of the invention.

What is claimed is:

1. A bandwidth compression method for frames of gray scale digital video image data including lines of pixels comprising, calculating the two dimensional mean gray scale level of a predetermined plurality of pixels located about a pixel in question, calculating the two dimensional activity level of a plurality of pixels relative to the pixel in question, comparing a predetermined combination of the activity level and the mean to a threshold, turning the pixel in question either black or white in response to the results of the comparison, determining the intraframe correlation of the lines of the frame, determining a first interframe correlation between the lines of the present frame and the corresponding lines of the previous frame, generating a plurality of displaced versions of the previous frame, each displaced version being shifted by one or more pixels in either the lateral, vertical or diagonal directions, determining additional interframe correlations between the lines of the present frame and the corresponding lines of each of the displaced versions of the previous frame, comparing the intraframe correlation and interframe correlations and selecting as a reference the frame having the best correlation with the present frame, run length encoding in two dimensions the present frame with respect to the reference.

* * * * *